United States Patent

Cip et al.

[11] Patent Number: 5,833,734
[45] Date of Patent: Nov. 10, 1998

[54] PROCESS FOR THE DIRECT REDUCTION OF PARTICULATE IRON-CONTAINING MATERIAL AND A PLANT FOR CARRYING OUT THE PROCESS

[75] Inventors: Gerhard Cip; Gottfried Rossmann, both of Linz; Konstantin Milionis, St. Georgen, all of Austria; Roy Hubert Whipp, Jr., Windermere, Fla.

[73] Assignees: Voest-Alpine Industrieanlagenbau GmbH, Austria; Brifer International Ltd., Barbados

[21] Appl. No.: 849,838

[22] PCT Filed: Oct. 8, 1996

[86] PCT No.: PCT/AT96/00190

§ 371 Date: Jul. 24, 1997

§ 102(e) Date: Jul. 24, 1997

[87] PCT Pub. No.: WO97/13879

PCT Pub. Date: Apr. 17, 1997

[30] Foreign Application Priority Data

Oct. 10, 1995 [AT] Austria ................. A 1682/95
Aug. 21, 1996 [AT] Austria ................. A 1507/96

[51] Int. Cl.[6] ............................................ C22B 5/14
[52] U.S. Cl. .................. 75/450; 75/444; 266/142; 266/156; 266/172
[58] Field of Search .............. 266/142, 44, 172, 266/156; 75/444, 450

[56] References Cited

U.S. PATENT DOCUMENTS

| | | | |
|---|---|---|---|
| 2,547,685 | 4/1951 | Brassert et al. | 266/172 |
| 3,021,208 | 2/1962 | Feinman | 266/142 |
| 5,082,251 | 1/1992 | Whipp | 266/142 |
| 5,185,032 | 2/1993 | Whipp | 266/172 |
| 5,192,486 | 3/1993 | Whipp | 266/172 |
| 5,407,179 | 4/1995 | Whipp | 266/142 |
| 5,439,504 | 8/1995 | Czermak et al. | 266/172 |
| 5,531,424 | 7/1996 | Whipp | 266/172 |
| 5,554,206 | 9/1996 | Czermak et al. | 266/142 |
| 5,674,308 | 10/1997 | Meissner et al. | 266/172 |

FOREIGN PATENT DOCUMENTS

| | | |
|---|---|---|
| 1109510 | 10/1995 | China . |
| 0571358 | 11/1993 | European Pat. Off. . |
| 0614990 | 9/1994 | European Pat. Off. . |
| 3100767 | 1/1982 | Germany . |
| 4037977 | 6/1992 | Germany . |
| 61-099611 | 5/1986 | Japan . |
| 1599163 | 9/1981 | United Kingdom . |

*Primary Examiner*—Scott Kastler
*Attorney, Agent, or Firm*—Ostrolenk, Faber, Gerb & Soffen, LLP

[57] ABSTRACT

With a process for the direct reduction of particulate iron-containing material by fluidization, reformed gas, at least partially freed from $CO_2$, is supplied to a fluidized-bed reduction zone as a reducing gas and is carried off from the same as a top gas and at least a portion of the top gas together with reformed gas is utilized for direction reduction. To economize on parts of the plant that are impinged on by reducing gas and in order to achieve savings in terms of heating costs, $CH_4$ and $N_2$ are, in addition to $CO_2$, at least partially removed by adsorption, from 50 to 100% of the reformed as and 0 to 100% of the top gas, and the tail gas removed from the reformed gas and/or the top gas by adsorption is utilized as a heating gas.

20 Claims, 2 Drawing Sheets

PROCESS FOR THE DIRECT REDUCTION OF PARTICULATE IRON-CONTAINING MATERIAL AND A PLANT FOR CARRYING OUT THE PROCESS

The invention relates to a process for the direct reduction of particulate iron-containing material by fluidization, wherein reformed gas, at least partially freed from $CO_2$, is supplied to a fluidized-bed reduction zone as a reducing gas and is carried off from the same as a top gas and wherein at least a portion of the top gas together with reformed gas is utilized for direct reduction, and a plant for carrying out the process.

A process of this type is known from EP-A-0 571 358 and from U.S. Pat. No. 5,082,251. Here, iron-rich fine ore is reduced in a system of serially arranged fluidized bed reactors under elevated pressure by means of a reducing gas formed of natural gas by reforming. The iron powder thus produced is subsequently subjected to hot or cold briquetting.

With these known processes, in order to avoid too high a $CO_2$ content in the reducing gas, the $CO_2$ is eliminated from the reducing gas before introducing the latter into the first fluidized bed reactor, through scrubbing by means of a conventional $CO_2$ scrubbing operation based on the principle of physical or chemical absorption. By the $CO_2$ scrubbing, a high selectivity is achieved, i.e. predominantly $CO_2$ and $H_2S$ are removed from the gas stream that is to be purified. Other molecules, such as for instance $H_2$, $CH_4$, $N_2$ etc., are practically not bound by the absorbent and persist within the purified gas stream. Natural gas is utilized for heating the reformer and, furthermore, for heating a reducing-gas heater, wherein optionally top gas is admixed.

The invention has as its object to further develop these known processes, namely in that, at constant reducing power, the volume of the reducing gas is to be decreased so as to enable savings in respect of all parts of the plant that are impinged on by the reducing gas. In particular, savings in terms of investment costs for the reducing-gas compressors and a reduction in the electricity consumed in compressing the reducing gas as well as savings with respect to heating costs are to be achieved, while the production capacity is at least to be kept equal or to be increased. Furthermore, it is to be feasible to employ the tail gas forming in the $CO_2$ elimination plant in a manner that will be useful for the process.

With a process of the initially described kind, this object is achieved in that $CH_4$ and $N_2$ are, in addition to $CO_2$, at least partially removed by adsorption, preferably by pressure-swing adsorption, either 50 to 100% of the reformed gas and 0 to 100% of the top gas, that the reducing gas is heated and that the tail gas removed from the reformed gas and/or the top gas by adsorption is utilized as a heating gas.

From DE-C-40 37 977 it is known per se to alternatively use a $CO_2$-scrubber or a pressure-swing adsorption plant for direct reduction in the direct reduction of lumpy iron ore. With this process, the lumpy iron ore is reduced in a reduction shaft furnace in the fixed bed method and on being yielded from the reduction shaft furnace is charged to a melter-gasifier in which the reducing gas fed to the reduction shaft furnace is produced from coal and oxygen and the reduced iron ore is melted. The process in question is a process that is carried out at low pressure, whereas with the fluidization process in accordance with the invention, the reducing gas is conducted at a pressure that is considerably higher. From this, a particular advantage results for the process according to the invention, namely that—in contrast to the known process—there is no need for additional compressors for conducting the gas to the adsorption process. Accordingly, substantial savings in terms of electric energy result for the fluidization process.

Compared to $CO_2$ scrubbing, the adsorption process opens up the possibility of lowering the specific volume of the reducing gas while maintaining the same level of reducing power, due to the fact that with adsorption considerably larger amounts of $CH_4$ and of inert $N_2$ are sluiced out compared to $CO_2$ scrubbing. This results in savings with respect to the parts of the plant that are concerned by this circumstance, such as pipes, compressors, valves etc.

Since the tail gas removed from the reformed gas and/or the top gas by pressure-swing adsorption has a very high heating value, it is suitably utilized in order to heat the reducing gas and/or as a heating gas for the reforming process carried out to produce the reformed gas.

Prior to $CO_2$ elimination, the reformed gas suitably is cooled down considerably, optionally by mixing with top gas, preferably to a temperature ranging between 20° and 100° C., particularly between 30° and 50° C., whereby it becomes feasible to substantially enhance the efficiency of the pressure-swing adsorption.

The realization of the process according to the invention will be particularly advantageous if the direct reduction of the particulate iron-containing material is carried out in several fluidized-bed reduction zones subsequently connected in series, wherein the fine-particulate iron-containing material is conducted from fluidized-bed zone to fluidized-bed zone by gravity from the top downward and the reducing gas from fluidized-bed zone to fluidized-bed zone in the opposite direction, the reducing gas spent during direct reduction being carried off the uppermost fluidized-bed reduction zone as a top gas, mixed with reformed gas and utilized as a reducing gas.

Suitably, heating of the reducing gas is effected in two stages, namely in a first stage by heat exchange and in a second stage through partial combustion by means of oxygen that has been introduced; the reducing gas. This is of particular advantage if utilizing the pressure-swing adsorption plant, since the pressure-swing adsorption plant yields a reducing gas having 0 vol. % water. It thus becomes feasible to keep the water content in the reducing gas to a very low level even after heating has been effected by means of afterburning and/or partial combustion, although during afterburning and/or partial combustion the $H_2O$ content increases by 1 to 5 vol. % at the expense of the $H_2$ content. Possible losses in CO due to afterburning and/or partial combustion can be balanced by modifying the operating characteristics of the reformer, for instance using a smaller steam:carbon ratio or for instance increasing the bypass-stream to the adsorption plant.

A plant for carrying out the process according to the invention, comprising at least one fluidized bed reactor for receiving the iron oxide-containing material, a reducing-gas feed duct leading to this fluidized bed reactor and a top gas-discharge duct carrying off the top gas forming during reduction from the fluidized bed reactor, with a reformer, a reformed-gas duct departing from the reformer and merging with the top-gas duct, the reducing gas formed from reformed gas and top gas passing into the fluidized bed reactor via the reducing-gas feed duct, and with a $CO_2$ elimination plant, characterized in that the $CO_2$ elimination plant is constructed as an adsorption plant, preferably as a pressure-swing adsorption plant, that a duct conducting the gas that has been freed from $CO_2$ from the adsorption plant to a heating means and a tail-gas discharge duct discharging tail gas that has been separated by the adsorption plant lead to a heating means.

For simple adjustment of the desired chemical composition of the reducing gas, the adsorption plant is bypassed by means of a top-gas branch duct as well as optionally by a branch duct conducting reformed gas, which departs from the reformed-gas duct.

Suitably, the tail-gas discharge duct is flow-connected with the heating means of the reformer or is flow-connected with a gas heater for the reducing gas.

In order to achieve optimum efficiency of the pressure-swing adsorption plant, advantageously a gas cooler is provided in the gas supply duct leading to the adsorption plant.

An optimum design of a plant according to the invention is characterized in that a plurality of fluidized bed reactors is subsequently connected in series, the iron-oxide-containing material being conducted from fluidized bed reactor to fluidized bed reactor via conveying ducts in one direction and the reducing gas from fluidized bed reactor to fluidized bed reactor via connection ducts in the opposite direction, and wherein within each of the fluidized bed reactors cyclones are provided for separating fine particles that have been entrained with the reducing gas.

Efficient heating of the reducing gas is characterized in that there are provided a heat exchanger as a heating means for the reducing gas and in serial arrangement thereto, a partial combustion means for the reducing gas with an oxygen-supply duct.

BRIEF DESCRIPTION OF THE DRAWINGS

In the following, the invention will be explained in more detail with reference to two exemplary embodiments illustrated in the drawing, FIGS. 1 and 2, illustrating one process scheme each, in accordance with a preferred embodiment of the invention.

According to FIG. 1, the plant according to the invention comprises four fluidized bed reactors 1 to 4 consecutively connected in series, wherein iron-oxide-containing material, such as fine ore, through an ore supply duct 5 is supplied to the first fluidized bed reactor 1, in which heating to reduction temperature (or prereduction) takes place, and subsequently is conducted from fluidized bed reactor to fluidized bed reactor via conveying ducts 6. The completely reduced material (sponge iron) is hot briquetted in a briquetting arrangement 7.

Figure 1:
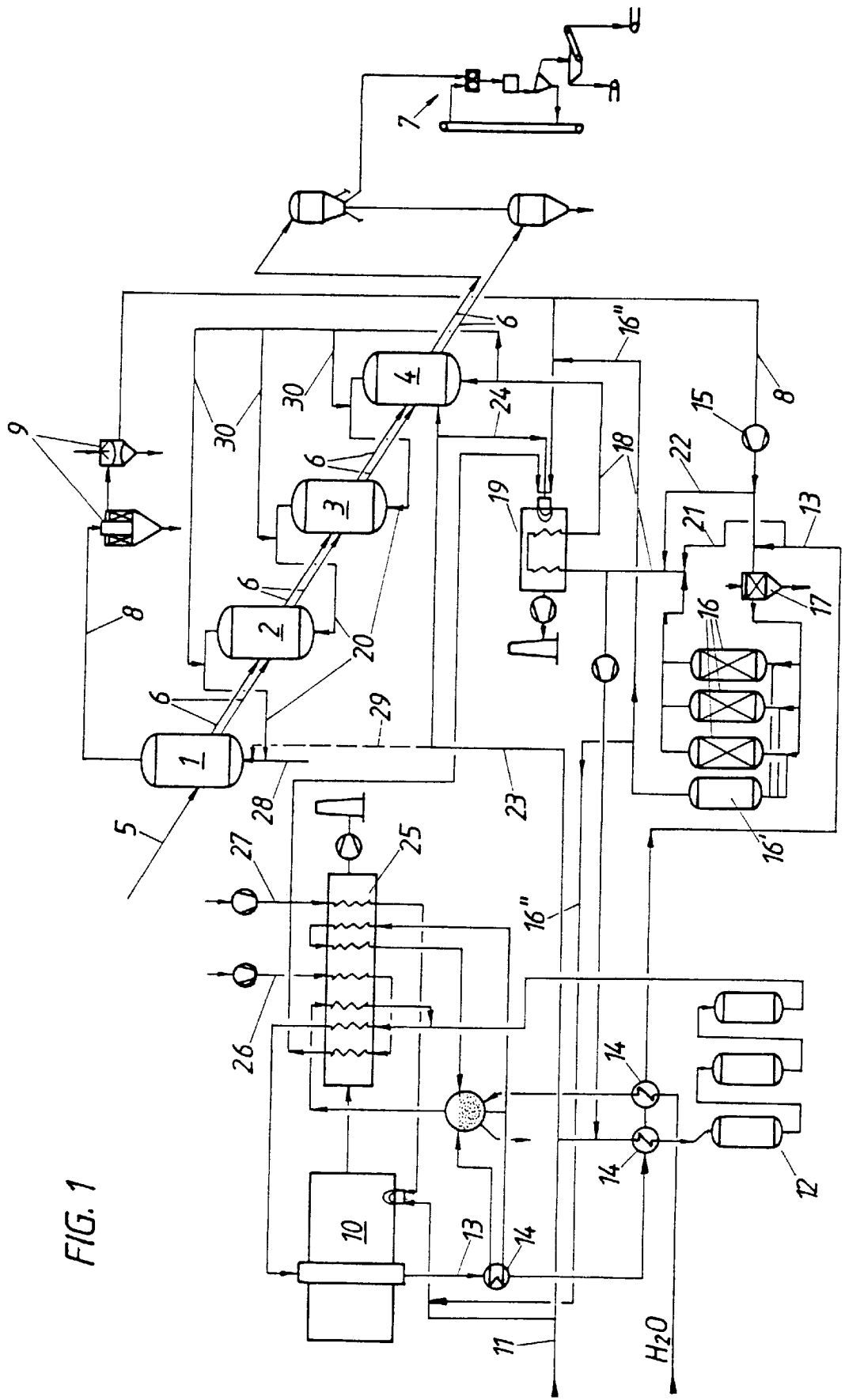

If required, the reduced iron is protected from re-oxidation during briquetting by an inert gas system not illustrated.

Prior to introducing the fine ore into the first fluidized bed reactor 1, it is subjected to ore preparation, such as drying and sieving, not illustrated in detail.

Reducing gas is conducted in counterflow to the ore flow from fluidized bed reactor 4 to fluidized bed reactor 3 to 2 and then to 1 and is carried off the last fluidized bed reactor 1, viewed in the gas flow direction, as a top gas through a top-gas discharge duct 8 and is cooled and scrubbed in a wet scrubber 9. Within the fluidized bed reactors 1 to 4, cyclones that are not illustrated in the drawing are provided for separating fine particles entrained with the reducing gas.

The production of reducing gas is effected by reforming in a reformer 10 natural gas fed through a duct 11 and desulfurized in a desulfurization plant 12. The gas leaving the reformer 10 and formed of natural gas and steam essentially consists of $H_2$, $CO$, $CH_4$, $H_2O$ and $CO_2$. This reformed natural gas is supplied through a reformed-gas duct 13 to several heat exchangers 14, in which it is cooled, water thus being condensed out of the gas.

The reformed-gas duct 13 runs into the top-gas discharge duct 8 after the top gas has been compressed by means of a compressor 15. The mixed gas thus forming is passed through a pressure-swing adsorption plant 16 and is freed from $CO_2$ and at least partially also from $H_2S$, $CH_4$ and $N_2$. It is then available as a reducing gas.

In the adsorption plant 16 including a gas accumulator 16', the gas that is to be purified is conducted through vessels that are filled with molecular sieves; depending on the adsorbent that is selected, certain molecules are removed preferentially, due to their size and polarity. If purifying synthesis gas formed from natural gas by reforming or recycled top gas, selectivity with this process is lower than with $CO_2$ scrubbing operations, i.e. a more substantial portion of separated gas incurs. However, this waste gas, hereinafter called "tail gas", in contrast to the waste gas incurring during $CO_2$ scrubbing has a relatively high heating value and thus can be burned in the furnaces required for the direct reduction process, for instance for heating the reducing gas or for heating the steam reformer, and can consequently reduce the amount of external energy usually required for combustion.

Via ducts 16", the accumulator 16' for receiving the tail gas is connected with the steam reformer 10 in order to effect the heating of the latter and with a gas heater 19 for heating the reducing gas.

The pressure-swing adsorption plant 16 is arranged to be preceded by a gas cooler 17, in which the gas supplied to the pressure-swing adsorption plant 16 is cooled to approximately 40° C. or below, thereby ensuring a good efficiency of the pressure-swing adsorption plant 16. Cooling-down may be effected by direct water cooling or by indirect cooling.

Via a reducing-gas supply duct 18, this reducing gas is heated to a reducing-gas temperature of about 800° C. in gas heater 19 arranged to follow the pressure-swing adsorption plant 16 and is fed to the first fluidized bed reactor 4, viewed in the gas flow direction, where it reacts with the fine ores to produce directly reduced iron. The fluidized bed reactors 4 to 1 are arranged in series; the reducing gas passes from fluidized bed reactor 4 to fluidized bed reactor 3, 2 and 1 through connection ducts 20.

According to the invention, the pressure-swing adsorption plant 16 is either supplied only with reformed gas or with a gas mixture consisting of 50 to 100% of the reformed gas and 0 to 100% of the top gas.

Departing from the reformed-gas duct 13, a branch duct 21 branches off, before the reformed-gas duct 13 merges with the top-gas discharge duct 8. This branch duct 21 unites with the reducing-gas feed duct 18 leading from the pressure-swing adsorption plant 16 to the gas heater 19. Furthermore, a further branch duct 22 departs from the top-gas discharge duct 8 and also unites with the reducing-gas feed duct 18 leading from the pressure-swing adsorption plant 16 to the gas heater 19. By means of these two branch ducts 21, 22, which, obviously, like all other gas ducts, are provided with valves, it becomes feasible either to feed to the pressure-swing adsorption plant 100% reformed gas exclusively or to supply the pressure-swing adsorption plant 16 with a mixed gas consisting of 50 to 100% of the reformed gas and 0 to 100% of the top gas.

In order to adjust the reducing gas, the following options are available in addition to choosing a specific adsorbent:

conducting portions ranging from 0 to 100% of the stream of gases conducted to the pressure-swing adsorption plant 16 past the pressure-swing adsorption plant 16 in a defined manner—preferably 0 to 30% of the synthesis gas or reformed gas etc., or preferably 0 to 100% of the recycled top gas.

due to the fact that in comparison to $CO_2$ scrubbing the pressure-swing adsorption plant 16 sluices out a greater amount of $CH_4$ and inert $N_2$, it becomes feasible to lower the specific volume of the reducing gas while maintaining the same level of reducing power. Thereby it becomes feasible to undertake savings with respect to the parts of the plant that are concerned. If desiring a higher content of $CH_4$ than can be obtained through the above-described kinds of connections, then via the duct 23 natural gas or pure $CH_4$ can be introduced into the stream of reducing gas conducted to the reduction reactors 1 to 4.

A portion of the top gas is sluiced out of the gas circulatory system 8 in order to avoid enrichment of inert gases, such as $N_2$. The sluiced-out top gas is fed through a branch duct to the gas heater 19 for heating the reducing gas and is burnt there. Possible shortages of energy are supplemented by natural gas supplied through a feed duct 24.

The sensible heat of the reformed natural gas emerging from the reformer 10 as well as that of the reformer smoke gases is utilized in a recuperator 25 to preheat the natural gas after passage through the desulfurization plant 12, to produce the steam required for reformation and to preheat the combustion air supplied to the gas heater 19 through duct 26 as well as, if desired, also the reducing gas. The combustion air supplied to the reformer through duct 27 is preheated as well.

In order to avoid a decrease in temperature in the fluidized bed reactor 1 arranged first in direction of the ore flow, it can be of advantage to combust a portion of the reducing gas exiting the second fluidized bed reactor 2 in the first fluidized bed reactor, for which purpose an oxygen supply duct 28 and optionally a natural-gas supply duct 29 open into the first fluidized bed reactor.

In order to keep the reaction temperature in all of the fluidized bed reactors 1 to 4 constant at the same level and thereby achieve a further reduction in the energy demand, hot and fresh reducing gas is supplied to the fluidized bed reactors 1 to 3, which are arranged subsequently to the fluidized bed reactor 4 arranged first in the direction of flow of the reducing gas, directly, via the branch ducts 30, in an amount of approximately 10% per fluidized bed reactor 1, 2 and 3. Thus, the fluidized bed reactors 1 to 4 are not only connected in series with respect to reducing-gas conduction but, as far as the feeding of a small portion of the reducing gas is concerned, are also connected in parallel, whereas with respect to the discharge or passing-on of reducing gas the fluidized bed reactors 1 to 4 with the depicted exemplary embodiment are exclusively connected in series.

Figure 2:
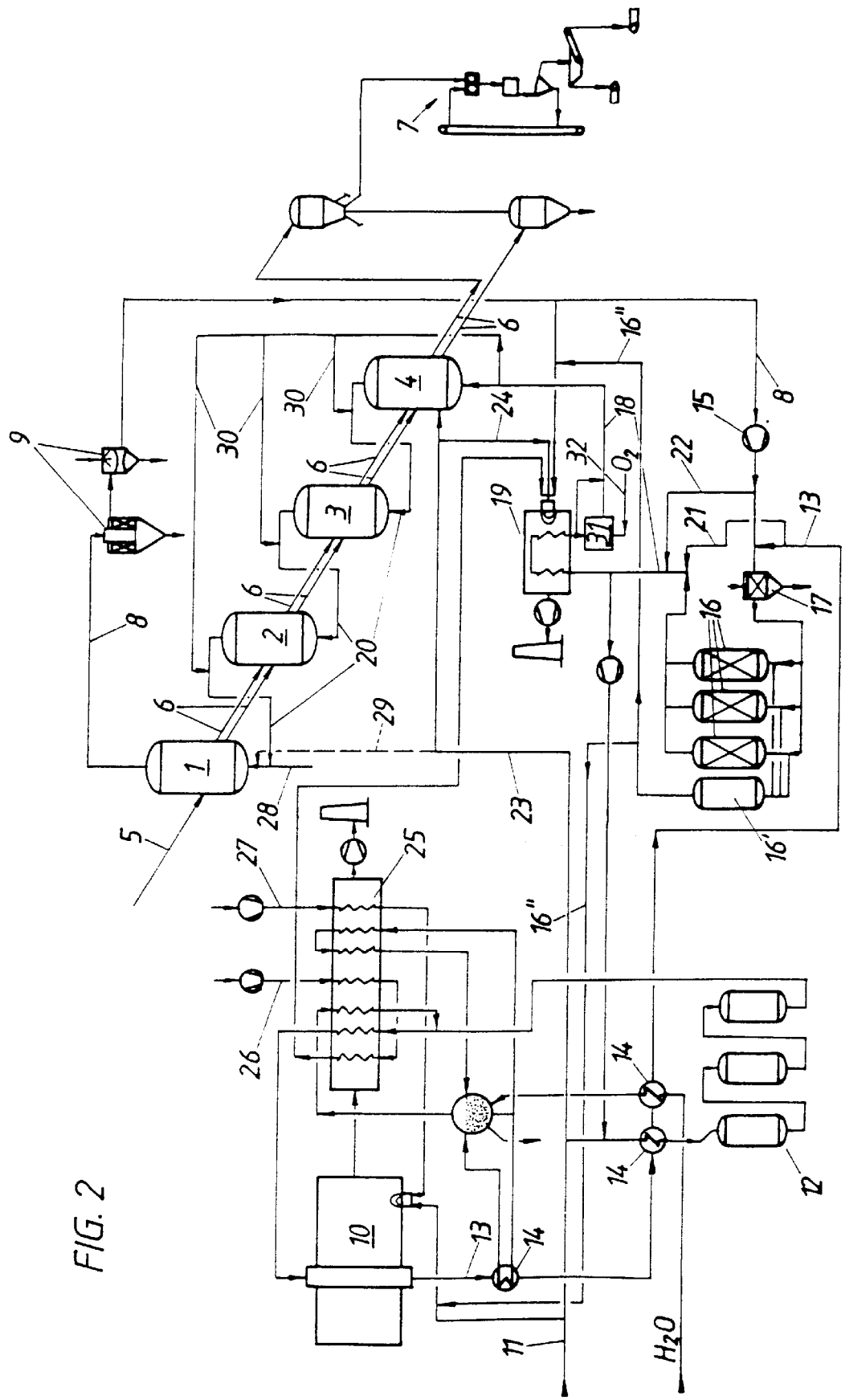

In accordance with the plant illustrated in FIG. 2, heating of the reducing gas is effected in two stages, namely in a first stage by heat exchange in the gas heater 19 and in a second stage through partial combustion in a partial combustion means 31 by means of oxygen that has been introduced into the reducing gas via a duct 32.

Advantageously, the gas that is to be heated is first brought to a temperature ranging from 200° to 600° C. in a gas heater 19 that is operated as an indirect heat exchanger. Supply of heat can be effected by burning any desired fuel or fuels, preferably, natural gas and top gas branched off from the reduction process are utilized.

Further heating of the reducing gas to temperatures preferably ranging from 700° to 900° C. can be effected by the following variants:

a) by separating a partial stream of the reducing gas and stoichiometrically combusting the same with pure oxygen (optionally it is also feasible to utilize a mixture that contains air). This partial stream is mixed with the remaining, cooler portion of the reducing gas, so that the desired final temperature of the total stream of reducing gas ensues.

b) by introducing the total amount of reducing gas into a combustion chamber and partially combusting it (i.e. substoichiometrically). By re-mixing the burnt gases with the unburnt gases, the desired final temperature adjusts.

Thus, by this method of heating, the problem of metal dusting can be eliminated and the process can be operated in a more economical manner due to the reduced pressure loss incurring in partial combustion furnaces as compared to typical indirectly heated furnaces.

The analysis of the reducing gas is also modified as a result of the partial combustion; typically, the content of $H_2O$ increases at the expense of the $H_2$ content by 1 to 5 vol. %. The same applies with regard to the $CO_2$ content at the expense of the CO content.

In order to adjust the content of the reducing gas after heating, the process therefore has to be operated in a suitable manner before heating is effected. This is enabled by variable operating characteristics of the $CO_2$ elimination, of the reformer etc.: In this way, $CO_2$ production during partial combustion can be balanced without difficulty, for instance by adjusting to a lower $CO_2$ content at the outlet of the pressure-swing adsorption plant 16. Loss of CO due to partial combustion can be compensated for by modifying the operational characteristics of the reformer (for instance a reduced steam: carbon ratio) or for instance by feeding a more substantial bypass-stream to CO conversion. With modifications, the above also applies to the adjustment of the $H_2$ and $H_2O$ contents.

Since the pressure-swing adsorption plant produces a reducing gas with 0 vol. % water, the water content in the reducing gas passed on to the reduction reactors—i.e. after heating in the partial combustion furnace—can be kept very low (in the range of 1 to 2 vol. %).

The invention is not limited to the exemplary embodiments illustrated in the drawing but can be modified in various respects. For example, it is feasible to select the number of fluidized bed reactors as a function of actual requirements. Instead of pressure-swing adsorption, it is also feasible to employ the temperature-swing adsorption process. The former makes use of the elevated system pressure of the instant direct reduction process, i.e. adsorption and regeneration of the adsorbent are effected by different pressurization of the vessels, wherein no external energy supply is needed for pressurization but the system pressure is exploited directly. With the second variant, the temperature-swing adsorption (abbr. TSA), the adsorption- and regeneration process is controlled by a suitable temperature profile at a virtually constant pressure. The adsorption power of the active medium is a function not only of the pressure but also of the temperature. With the present field of invention, this process is regarded as second choice, since pressure-swing adsorption is predestined for the analyses of the reformed gas and the top gas as well as for the present system pressure.

EXAMPLE A

In a plant corresponding to FIG. 1 and having a capacity per hour of 75 t/h hot briquetted iron, 104 t/h fine ore are reacted.

In the steam reformer 10, 108,000 Nm³ reformed gas are formed by reaction of 18,100 Nm³/h natural gas with 60,300 Nm³/h steam. The amount of heat required for undergrate firing, namely 94 MW, is covered by natural gas (61 MW), preheated air (23 MW) and tail gas (10 MW).

70% of the reformed gas are mixed with 55% of the recycled topgas and after having been cooled to 40° C. are fed to the pressure-swing adsorption plant 16 at a pressure of 14.25 bar. The purified gas, which has a temperature of 45° C. and a pressure of 13.45 bar, is mixed with the gas streams conducted past it—in sum 179,900 Nm³/h—and fed to the reducing gas heater 19.

The separated tail gas—22,900 Nm³/h—is available at a pressure of 0.3 bar, a temperature of 35° C. and an energy content of 60 MW.

In order to heat the reducing gas to 835° C., 65 MW are needed, made up of 50 MW tail gas, 14.7 MW preheated air and 0.3 MW top gas.

The hot briquetted iron exhibits a degree of metallization of 92%.

The respective analyses of the gases are:

|  | reformed gas | gas to the pressure-swing adsorption plant | tail gas | reducing gas |
| --- | --- | --- | --- | --- |
| CO [Vol. %] | 7.7 | 9.2 | 9.8 | 8.8 |
| $CO_2$ [Vol. %] | 6.0 | 8.1 | 38.9 | 4.1 |
| $H_2$ [Vol. %] | 47.0 | 63.1 | 20.1 | 67.0 |
| $H_2O$ [Vol. %] | 36.1 | 1.9 | 9.8 | 1.6 |
| $N_2$ [Vol. %] | 0.9 | 5.3 | 4.8 | 5.7 |
| $CH_4$ [Vol. %] | 2.3 | 12.4 | 16.6 | 12.8 |

In comparison to the prior art, the process according to the invention yields a reducing gas that has a markedly lower level of $N_2$ or $CH_4$ (for instance in accordance with EP-A-0 571 358: 14.94 vol. % $N_2$, 16.29 vol. % $CH_4$) and hence an enhanced reducing power.

The charged fine ore has 96.91 wt. % $Fe_2O_3$ and 2.29 wt. % gangue, the balance being L.O.I.

EXAMPLE B

In a plant corresponding to FIG. 1 and having a capacity per hour of 75 t/h hot briquetted iron, 104 t/h fine ore are reacted.

In the steam reformer 10, 100,100 Nm³/h reformed gas are formed by reaction of 17,200 Nm³/h natural gas with 55,700 Nm³/h steam. The amount of heat required for undergrate firing, namely 86 MW, is covered by natural gas (25 MW), preheated air (21 Mw) and tail gas (40 MW).

90% of the reformed gas are mixed with 60% of the recycled top gas and after having been cooled to 40° C. are fed to the pressure-swing adsorption plant 16 at a pressure of 14.25 bar. The purified gas having a temperature of 45° C. and a pressure of 13.45 bar is mixed with the gas streams conducted past it—in sum 184,000 Nm³/h—and is fed to the reducing gas heater 19.

The separated tail gas—26,900 Nm³/h—is available at a pressure of 0.3 bar, a temperature of 35° C. and an energy content of 87 MW.

In order to heat the reducing gas to 835° C., 68 MW, made up of 47 MW tail gas, 15 MW preheated air and 6 MW top gas, are needed.

The hot briquetted iron exhibits a degree of metallization of 92%.

The respective analyses of the gases are:

|  | reformed gas | gas to the pressure-swing adsorption plant | natural gas | tail gas | reducing gas |
| --- | --- | --- | --- | --- | --- |
| CO [Vol. %] | 7.7 | 8.2 | 0.0 | 8.8 | 7.4 |
| $CO_2$ [Vol. %] | 6.0 | 6.9 | 0.2 | 33.6 | 2.6 |
| $H_2$ [Vol. %] | 47.0 | 60.8 | 0.0 | 19.7 | 64.1 |
| $H_2O$ [Vol. %] | 36.1 | 1.8 | 0.0 | 9.9 | 1.6 |
| $N_2$ [Vol. %] | 0.9 | 4.9 | 5.3 | 4.5 | 5.5 |
| $CH_4$ [Vol. %] | 2.3 | 17.4 | 94.3 | 23.5 | 18.8 |
| $C_2H_6$ [Vol. %] | 0.0 | 0.0 | 0.2 | 0.0 | 0.0 |

The essential difference between Examples A and B is the different $CH_4$ content of the reducing gas. $CH_4$ is regarded as an inert portion for the reduction proper, but still may influence product quality. With Example A, the $CH_4$ content of the reducing gas is at about 12.8 vol. %, with Example B, however, at 18.8 vol. %, which entails a higher carbon content of the subsequent briquetted product. This higher carbon content can be (though not necessarily is) regarded as an advantage with certain applications of the product. For instance, the higher carbon content can lead to energy savings during melting in subsequent steel-making operations carried out in an electric furnace.

The charged fine ore includes 96.91 wt. % $Fe_2O_3$ and 2.29 wt. % gangue, the balance being made up of L.O.I.

EXAMPLE C

In a plant for the production of 75 t/h hot briquetted iron, the following configuration is selected for producing the reducing gas:
- production of 130,000 Nm³/h reformed gas having the same analysis as in Example A
- 100% of the reformed gas are fed to the pressure-swing adsorption plant 16 after having been cooled
- the gas thus purified is mixed with the recycled top gas
- the sum of the gas streams—181,000 Nm³/h—is fed to the reducing gas heater 19

The hot briquetted iron exhibits a degree of metallization of 92%.

The respective analyses of the gases are:

|  | reformed gas | gas to the pressure-swing adsorption plant | tail gas | reducing gas |
| --- | --- | --- | --- | --- |
| CO [Vol. %] | 7.7 | 7.2 | 7.5 | 6.5 |
| $CO_2$ [Vol. %] | 6.0 | 13.2 | 61.3 | 4.4 |
| $H_2$ [Vol. %] | 47.0 | 74.4 | 23.1 | 70.4 |
| $H_2O$ [Vol. %] | 36.1 | 0.5 | 2.5 | 1.3 |
| $N_2$ [Vol. %] | 0.9 | 1.3 | 1.2 | 4.2 |
| $CH_4$ [Vol. %] | 2.3 | 3.4 | 4.4 | 13.2 |

The iron ore has the same composition as in Example A. Advantages resulting from this variant:
- reduction in the capacity of the pressure-swing adsorption plant (30 to 40% as compared to Examples A and B)
- no $H_2S$ content in the tail gas (with Examples A and B, the latter is introduced into the top gas cycle together with the iron ore and in part is sluiced out by the pressure-swing adsorption plant)—as a consequence, $SO_2$, which is detrimental to the environment, does not incur during subsequent thermal utilization of the tail gas, i.e. a desulfurization plant is no longer necessary.

We claim:

1. A process for the direct reduction of particulate iron-containing material by fluidization in which a reformed gas which has been at least partially freed from $CO_2$ is supplied to a fluidized bed reduction zone as a reducing gas and is removed from the fluidized bed reduction zone as a top gas and in which at least a portion of the top gas together with the reformed gas is utilized for direct reduction characterized in that methane and nitrogen are, in addition to $CO_2$, at least partially removed by adsorption from 50% to 100% of the reformed gas and 0% to 100% of the top gas and the reducing gas is heated after the adsorptive removal and in which a tail gas removed from the reformed gas or the top gas or both by adsorption is used as a heating gas.

2. A process according to claim 13, characterized in that the tail gas is utilized to heat the reducing gas or as a heating gas for the reforming process carried out to produce the reformed gas, or both.

3. A process according to claim 2, characterized in that prior to $CO_2$ elimination, the reformed gas is cooled down to a temperature ranging between 20° and 100° C.

4. A process according to claim 3, characterized in that the direct reduction of the particulate iron-containing material is carried out in several fluidized-bed reduction zones connected in series, wherein the particulate iron-containing material is conducted from fluidized-bed zone to fluidized-bed zone by gravity from the top downward and the reducing gas from the fluidized-bed zone to fluidized-bed zone in the opposite direction, and that the reducing gas spent during direct reduction is carried off the uppermost fluidized-bed reduction zone as a top gas, mixed with reformed gas and the mixture utilized as a reducing gas.

5. A process according to claim 4, characterized in that the removal by adsorption is by pressure-swing adsorption.

6. A process according to claim 5, characterized in that prior to $CO_2$ elimination, the reformed gas is cooled down to a temperature between 30° C. and 50° C.

7. A process according to claim 6, characterized in that the heating of the reducing gas is effected first by heat exchange and thereafter by partial combustion.

8. A process according to claim 1, characterized in that prior to $CO_2$ elimination the reformed gas is cooled down to a temperature ranging between 20° and 100° C.

9. A process according to claim 1, characterized in that the direct reduction of the particulate iron-containing material is carried out in several fluidized-bed reduction zones connected in series, wherein the particulate iron-containing material is conducted from fluidized-bed zone to fluidized-bed zone by gravity from the top downward and the reducing gas from the fluidized-bed zone to fluidized-bed zone in the opposite direction, and that the reducing gas spent during direct reduction is carried off the uppermost fluidized-bed reduction zone as a top gas, mixed with reformed gas and the mixture utilized as a reducing gas.

10. A process according to claim 1, characterized in that the removal by adsorption is by pressure-swing adsorption.

11. A process according to claim 1, characterized in that the heating of the reducing gas is effected first by heat exchange and thereafter by partial combustion.

12. A plant for the direct reduction of particulate iron-containing material by fluidization comprising at least one fluidized bed reactor having a gas inlet and a gas outlet, a first gas circulation system connected to said gas inlet and said gas outlet to permit gas to flow through said reactor in a first direction and comprising a gas source, a gas reformer, a carbon dioxide adsorber and a first heater connected in said first gas circulation system, a second gas circulation system comprising said gas outlet, said carbon dioxide absorber and said gas inlet, and wherein said absorber includes a discharge duct for a combustible tail gas separated in said adsorber.

13. A plant according to claim 12 which further comprises a second heater connected to said discharge duct.

14. A plant according to claim 12 in which said discharge duct is connected to said first heater.

15. A plant according to claim 12 further including a gas cooler in said first gas circulation system and upstream of said adsorber.

16. A plant according to claim 12 wherein said first heater comprises a heat exchanger and a partial combuster.

17. A plant according to claim 12 having a plurality of said fluidized bed reactors connected in series and each of said reactors having inlets and outlets arranged to permit iron oxide containing material to pass through said plurality of reactors counter-current to said first direction.

18. A plant according to claim 12 which further includes an adsorbant for methane and nitrogen in said adsorber.

19. A plant according to claim 12 which further includes an adjustable pressure control connected to said adsorber.

20. A plant according to claim 19 having a plurality of said fluidized bed reactors connected in series and each of said reactors having inlets and outlets arranged to permit iron oxide containing material to pass through said plurality of reactors counter-current to said first direction and having an adsorbant for methane and nitrogen in said adsorber and further having a gas cooler in said first gas circulation system and upstream of said adsorber.

\* \* \* \* \*